May 30, 1961 E. BARKER 2,986,334
EXTRACTOR OF MIRED TRACTORS AND TANKS
Filed Nov. 18, 1958
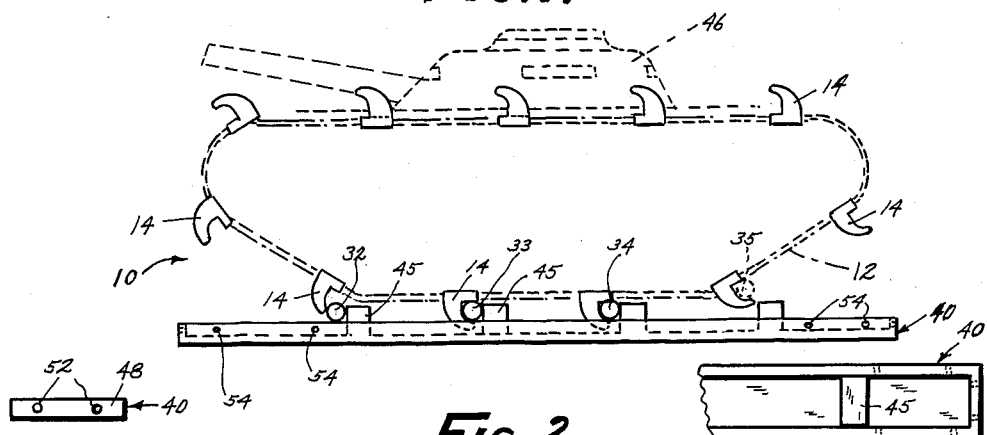
FIG. 1.
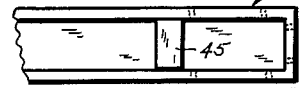
FIG. 4.   FIG. 2.   FIG. 3.
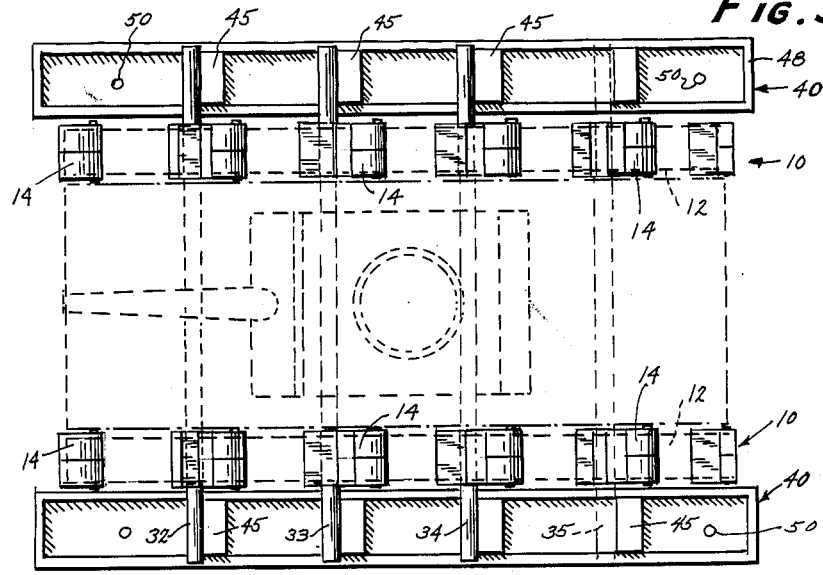
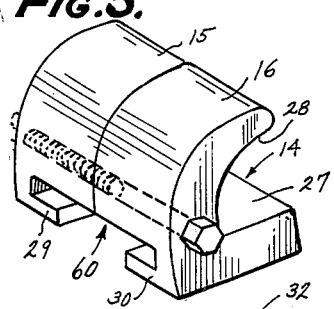
FIG. 5.
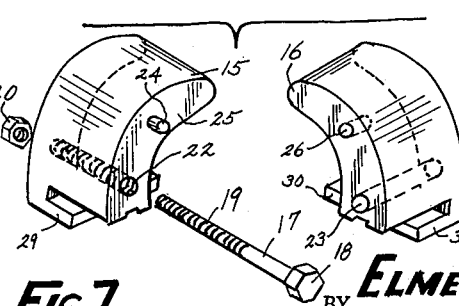
FIG. 6.
FIG. 7.
INVENTOR.
ELMER BARKER
BY Joseph B. Lindecker.
Attorney.

United States Patent Office 2,986,334
Patented May 30, 1961

2,986,334
EXTRACTOR OF MIRED TRACTORS AND TANKS
Elmer Barker, 133 High St., Dayton 3, Ohio
Filed Nov. 18, 1958, Ser. No. 774,544
3 Claims. (Cl. 238—14)

This invention relates to vehicles and more particularly to an accessory therefor.

It is an object of the present invention to provide apparatus for extracting tractors and tanks from ditches and soft earth.

Another object of the present invention is to provide a vehicle extractor of the above type that will provide positive traction means for various types of track type vehicles so as to enable such vehicles to be propelled out of soft earth without further enlarging the rut or ditch in which it is restrained.

A further object of the invention is to provide means for attaching rigid plates to the tracks which can be quickly attached and quickly removed therefrom.

A still further object of the invention is to provide quick attachable and removable hook-type means to the tracks, whereby rigid bars may be quickly arranged therewith and quickly removed therefrom.

And still further objects of the invention are to provide a vehicle extractor bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view of a track type vehicle (shown in phantom lines) employing extractor apparatus made in accordance with the present invention;

Figure 2 is a top plan view of the apparatus shown in Figure 1;

Figure 3 is a fragmentary bottom plan view of a traction plate forming a part of the present invention;

Figure 4 is an end elevational view of the traction plate shown in Figure 3;

Figure 5 is a perspective view of the hook-shaped attaching means bolted together;

Figure 6 is an exploded view of the hook parts shown in a perspective arrangement; and Figure 7 is a fragmentary perspective view of a hollow rigid bar as embodied in this invention.

Referring now more in detail to the drawing, extractor apparatus 10 made in accordance with the present invention for extracting track type vehicles from ditches and soft earth is shown to include a plurality of rigid bars of substantially tubular construction that are sequentially used with the tracks 12 of the vehicle.

The tracks 12 consist of a plurality of caterpillar pads shown dotted in Figures 1 and 2 hingedly connected together to form a flexible endless traction means. This invention includes the use of a plurality of extractor plates 14 shown by Figure 5. These extractor plates 14 consist of two hook-shaped plate members 15 and 16 which are assembled together and capable of being clamped together by a bolt 17, having a head 18 at one end and a threaded portion 19 at the opposite end thereof to receive a nut 20. The bolt 17 extends through holes 22 and 23 respectively, in said extractor plate members 15 and 16. Said hook-shaped member, or extractor plates 15, has a guide pin 24 horizontally assembled in its vertical side 25 for cooperating with a horizontally arranged bore 26 in plate 16, said bore in direct alignment with said pin 24 when said plates 15 and 16 are bolted together. When the guide pin 24 is inserted into said bore 26 and the plates 15 and 16 bolted together by bolt 17 and nut 20, the plates 15 and 16 form a single unit 14 comprising a continuous flat surface 27, a curved bar engaging surface 28 and clamping jaws 29 and 30.

A plurality of rigid tubular bars 32, 33, 34 and 35, as shown by Figures 1 and 2, form a part of this invention and their use will be described later.

A pair of traction plates 40 are placed, one along each side of the vehicle so as to slidably receive the outwardly projecting ends of the rigid bars 32–35 as they are sequentially rotated toward the lowermost position. The bars are used in conjunction with the extractor plates 14 after they are assembled to the caterpillar pads forming the traction means 12, as shown by Fig. 2. The bars are arranged across the two tracks 12 and to contact with a pair of said extractor plates 14, said bars projecting sufficiently outwardly beyond the sides of the vehicle so as to provide a substantial bearing engagement with the traction plates 40. As a result, the projecting ends of the rigid bars enable the tracks 12 of the vehicle to react against the upper surface of the bearing plates 40 rather than against the loose mud or dirt within which the vehicle is restrained. In addition, this also raises the vehicle up and out of the rut or ditch to the level of the traction plates 40 that may be supported upon higher ground alongside the vehicle.

The bars may be placed beneath the tracks 12 and upon the upper surface of the traction plate 40, and when the tracks 12 are moved, the extractor plates 14 will catch on to the stationary bar, as for example bar 32, moving the bar 32 against the cross cleats 45, embodied within the traction plates 40. As the vehicle moves forward, the rigid bars 32–35 will move under the vehicle. Of course, as the first applied rigid bar 32 approaches the top of the vehicle at the rear, it is necessary to remove it and replace it beneath the front end of the vehicle so as to cleat the upwardly extending body or turret 46. While this is a substantially slow deliberate process, it also assures the extraction of the vehicle in a foolproof manner.

As is more clearly shown in Figures 2 and 3 of the drawing, each traction plate 40 is provided with a plurality of transversely extending reinforcing ribs 45, as well as a peripheral skirt 48, all of which tend to increase the traction of the tracks upon the plates and to reinforce such plates throughout their entire length. In the event that the ground is slippery so as to cause longitudinal movement of the traction plates in use, apertures 50 extending through the plates are operative to receive ground engaging stakes or spikes that will secure them in place upon the ground. Openings 52 in the opposite end sections of the skirt 48 may be used for inserting special hooks attached to a truck for raising one end of the plate above the ground and for dragging the plate to a desired location either with or without the mired tractor or tank supported thereon. In addition, apertures 54 in the sides of the peripheral skirt 48 provide means for inserting lifting devices for men to carry such traction plates during the initial positioning thereof when other means are not available.

If desired, these metal traction plates may also be used as bridge elements for spanning small obstacles and ditches for all types of vehicles, such as during use upon a battlefield or the like. In any event, the assembly of parts makes it possible to extract and transport various types of vehicles as may be required.

From the above, it is easily seen that the two-piece plates are attachable to the track pads of tractors, tanks and various track type vehicles. These two piece plates can be used either in a forward going position, or can be reversed so the vehicle can go in the direction desired. A C shaped groove 60 is formed when the two pieces 15 and 16 are bolted together.

The upper surfaces of the jaws 29 and 30 fit against, or adjacent, the under side of the track pads while the upper surface of the groove 60 rests upon the outer surface of the track pads. The bolt 17 holds the parts 15 and 16 in tight engagement with the track 12; however, they are easily removed from the tracks 12. In general use, there should be at least a pair of bars in contact with the traction plate 40, when the vehicle is being extracted from the mud.

While various changes may be made in the detail construction, it shall be understood that such changes shall be within the spirit and scope of the present invention as defined by the appended claims.

What I claim as new and desire to protect by Letters Patent of the United States is:

1. An extractor for track type vehicles having a pair of tracks and each track having a plurality of track pads hingedly connected together forming a flexible endless track comprising, in combination, a plurality of rigid tubular bars greater in length than the width of the track type vehicle to be used therewith, a plurality of extractor plates, each extractor plate formed of two hook-shaped plate members, each hook-shaped plate member having a transverse horizontal bore extending therethrough and in direct horizontal alignment with each other when arranged in pairs side by side, a bolt with securing means at each end thereof extending through said transverse bore securing each pair of said hook-shaped members together forming one of said extractor plates, each of said hook-shaped plate members formed with clamping jaws on the bottom portion thereof, the jaws of each pair of cooperating hook-shaped plate members when joined together by said bolt forming a C-shaped groove open at the bottom and adapted to be attached to the track pads of an endless track with the upper surfaces of said pair of jaws bolted together arranged adjacent the under side of the track pads while the upper surface of said C-shaped groove rests upon the outer surface of the track pads, each pair of said hook-shaped plate members forming a continuous flat horizontal surface and a concave interior curved bar engaging surface for receiving straight tubular bars, and said hook-shaped plate members when assembled upon the track pads of an endless track for releasably securing said rigid tubular bars symmetrically upon the track type vehicle in a position extending transversely of the path of movement of the vehicle.

2. The combination according to claim 1, wherein individual horizontal traction plates are used for support upon the earth, one at each side of the vehicle, disposed in the path of movement of the ends of said rigid bars, said individual horizontal traction plates each comprising a rigid rectangular plate having a flat lower surface and a peripheral vertical skirt, and transverse integral reinforcing ribs substantially rectangular in cross-section extending upwardly from the inside upper surface of each said rectangular plate.

3. The combination according to claim 2, wherein each rectangular traction plate further comprises a plurality of positioning stake receiving apertures extending vertically through said upper and lower surfaces, and draw hook receiving horizontal openings in said peripheral skirt at the opposite end of said traction plate.

References Cited in the file of this patent

UNITED STATES PATENTS

| | | |
|---|---|---|
| 1,067,940 | Rohe et al. | July 22, 1913 |
| 1,258,466 | Robertson | Mar. 5, 1918 |
| 1,425,101 | Jury | Aug. 8, 1922 |
| 2,744,690 | McClain | May 8, 1956 |